(12) United States Patent
Dean et al.

(10) Patent No.: US 8,577,283 B2
(45) Date of Patent: Nov. 5, 2013

(54) TDD REPEATER

(75) Inventors: Richard Finch Dean, Lyons, CO (US); Kenneth Robert Baker, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 1201 days.

(21) Appl. No.: 11/182,231

(22) Filed: Jul. 15, 2005

(65) Prior Publication Data

US 2007/0015462 A1    Jan. 18, 2007

(51) Int. Cl.
*H04B 1/60* (2006.01)

(52) U.S. Cl.
USPC ............. 455/10; 455/7; 455/11.1; 455/13.1; 455/13.2; 455/553.1; 455/456.1; 455/456.5; 370/226; 370/236; 370/246; 370/274; 370/279; 370/280; 370/293; 370/345; 370/321; 370/324; 370/492; 370/501; 375/211

(58) Field of Classification Search
USPC ............. 455/7–25, 127.3, 144, 194.2, 253.2, 455/311, 341, 456.1–457, 11.1, 13.1, 13.2, 455/553.1; 370/274, 279, 280, 293, 294, 370/321, 324, 226, 236, 246, 315, 492, 370/501; 375/211
See application file for complete search history.

(56) References Cited

U.S. PATENT DOCUMENTS

| | | | |
|---|---|---|---|
| 3,879,581 A * | 4/1975 | Schlosser et al. | 370/324 |
| 4,284,848 A * | 8/1981 | Frost | 455/465 |
| 4,965,586 A * | 10/1990 | O'Neill et al. | 342/357.17 |
| 5,416,468 A * | 5/1995 | Baumann | 340/573.1 |
| 5,930,726 A * | 7/1999 | Fujita | 455/555 |
| 6,188,719 B1 * | 2/2001 | Collomby | 375/211 |
| 6,342,777 B1 * | 1/2002 | Takahashi | 370/315 |
| 6,507,741 B1 * | 1/2003 | Bassirat | 455/440 |
| 6,675,013 B1 * | 1/2004 | Gross et al. | 455/431 |
| 6,778,097 B1 * | 8/2004 | Kajita et al. | 340/825.69 |
| 6,810,028 B1 * | 10/2004 | Giallorenzi et al. | 370/324 |
| 7,218,891 B2 | 5/2007 | Periyalwar et al. | |
| 7,295,808 B2 * | 11/2007 | Soliman | 455/13.1 |
| 7,383,049 B2 * | 6/2008 | Deloach et al. | 455/456.1 |
| 7,457,584 B2 * | 11/2008 | Baker et al. | 455/11.1 |

(Continued)

FOREIGN PATENT DOCUMENTS

| | | |
|---|---|---|
| JP | 09214418 | 8/1997 |
| JP | 10247874 | 9/1998 |

(Continued)

OTHER PUBLICATIONS

International Serch Report—PCT/US/06/027677, International Search Authority—European Patent Office—Dec. 6, 2006.

(Continued)

*Primary Examiner* — Junpeng Chen
(74) *Attorney, Agent, or Firm* — Michael Johnson

(57) ABSTRACT

A repeater that facilitates communication in a wireless environment comprises a scheduling component that analyzes a schedule relating to when communications are active in the forward link direction and when communications are active in the reverse link direction, the communications are subject to time division duplexing. An amplifier that amplifies received communications as a function of the schedule. The repeater can further comprise a configuration component that configures the amplifier to amplify the received communications in one or more of a forward link direction and a reverse link direction.

45 Claims, 15 Drawing Sheets

(56) References Cited

U.S. PATENT DOCUMENTS

| | | | |
|---|---|---|---|
| 2001/0036833 A1* | 11/2001 | Koshima et al. | 455/457 |
| 2002/0045461 A1* | 4/2002 | Bongfeldt | 455/522 |
| 2002/0136230 A1 | 9/2002 | Dell et al. | |
| 2003/0125045 A1* | 7/2003 | Riley et al. | 455/456 |
| 2004/0146013 A1* | 7/2004 | Song et al. | 370/279 |
| 2004/0147221 A1* | 7/2004 | Sheynblat et al. | 455/12.1 |
| 2004/0192204 A1 | 9/2004 | Periyalwar et al. | |
| 2004/0203911 A1* | 10/2004 | Masuda et al. | 455/456.1 |
| 2005/0064879 A1* | 3/2005 | McAvoy | 455/456.1 |
| 2005/0096066 A1* | 5/2005 | Lee | 455/456.1 |
| 2005/0107090 A1 | 5/2005 | Hosein | |
| 2005/0208889 A1* | 9/2005 | Baker et al. | 455/7 |
| 2005/0254442 A1* | 11/2005 | Proctor et al. | 370/294 |
| 2006/0041395 A1* | 2/2006 | Ruelke et al. | 702/75 |
| 2006/0046642 A1* | 3/2006 | Bassiri et al. | 455/7 |
| 2006/0172710 A1* | 8/2006 | Cahana et al. | 455/101 |
| 2007/0291668 A1* | 12/2007 | Duan | 370/280 |

FOREIGN PATENT DOCUMENTS

| | | |
|---|---|---|
| JP | 11112403 | 4/1999 |
| JP | 2000134143 | 5/2000 |
| JP | 2002111571 A | 4/2002 |
| JP | 2002111579 | 4/2002 |
| JP | 2002335558 | 11/2002 |
| JP | 2002354538 | 12/2002 |
| JP | 2003304576 | 10/2003 |
| KR | 2004106811 A * | 12/2004 |
| TW | 588892 | 5/2004 |
| TW | 200507663 | 2/2005 |
| WO | WO2004002014 A1 | 12/2003 |
| WO | WO 2005/008919 A1 * | 1/2005 |
| WO | WO2005020519 | 3/2005 |

OTHER PUBLICATIONS

Taiwanese Search report—095125924—TIPO—Aug. 14, 2010.
Written Opinion—PCT/US/06/027677, International Search Authority—European Patent Office—Dec. 6, 2006.

* cited by examiner

TDD REPEATER

BACKGROUND

I. Field

The following description relates generally to wireless communications, and more particularly to a repeater in a time-division duplex (TDD) environment.

II. Background

In the not too distant past mobile communication devices in general, and mobile telephones in particular, were luxury items only affordable to those with substantial income. Further, these mobile telephones were significant in size, rendering them inconvenient for extended portability. For example, in contrast to today's mobile telephones (and other mobile communication devices), mobile telephones of the recent past could not be placed into a user's pocket or handbag without causing extreme discomfort. In addition to deficiencies associated with mobile telephones, wireless communications networks that provided services for such telephones were unreliable, covered insufficient geographical areas, were associated with inadequate bandwidth, and were associated with various other deficiencies.

In contrast to the above-described mobile telephones, mobile telephones and other devices that utilize wireless networks are now commonplace. Today's mobile telephones are extremely portable and inexpensive. For example, a typical modern mobile telephone can easily be placed in a handbag without a user thereof noticing existence of the telephone. Furthermore, wireless service providers often offer sophisticated mobile telephones at no cost to persons who subscribe to their wireless service. Numerous towers that transmit and/or relay wireless communications have been constructed over the last several years, thus providing wireless coverage to significant portions of the United States (as well as several other countries). Accordingly, millions (if not billions) of individuals own and utilize mobile telephones.

The aforementioned technological advancements are not limited solely to mobile telephones, as data other than voice data can be received and transmitted by devices equipped with wireless communication hardware and software. For instance, several major metropolitan areas have implemented or are planning to implement citywide wireless networks, thereby enabling devices with wireless capabilities to access a network (e.g., the Internet) and interact with data resident upon such network. Moreover, data can be exchanged between two or more devices by way of a wireless network. Given continuing advancement in technology, a number of users, devices, and data types exchanged wirelessly can be expected to continue to increase at a rapid rate.

Time division duplex (TDD) is one exemplary protocol that is currently utilized in wireless environments to transmit and receive voice communications and other data. Bi-directional communications between a user terminal and a base station occur within TDD systems over a same frequency during disparate time slots (e.g., an RF channel center frequency is substantially similar in a forward and reverse link). More specifically, when the base station is delivering data to the user terminal, the user terminal listens and does not communicate with the base station. Similarly, when the user terminal is delivering data to the base station, the base station listens and does not attempt to deliver data to the user terminal. Thus, in TDD systems, a user terminal and a base station do not simultaneously deliver data to one another over a same frequency.

In some wireless protocols, wireless repeaters are employed between mobile communication units (e.g., cellular phones, personal digital assistants, . . . ) and base stations to extend communication range there between. Repeaters receive signals between a base station and a user terminal, amplify the received signals, and re-transmit such signals. Repeaters can be employed to provide communication service to a coverage hole, which was previously not serviced by the base station. Repeaters can also augment coverage area of a sector by shifting the location of a coverage area or altering shape of the coverage area. Accordingly, repeaters are often highly desirably for utilization in wireless communications environments.

Various difficulties exist, however, with respect to utilizing repeaters within TDD systems. In particular, continuously amplifying signals in both directions in TDD systems would cause the repeater to oscillate; thus, the repeater would fail to amplify an intended signal and create interference within a wireless system. Without aid of repeaters, however, potential of TDD systems cannot be fully reached.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

The disclosed embodiments relate to systems, methods, articles of manufacture, and the like that can be employed to amplify signals in a TDD wireless environment, such as time division synchronous code division multiple access (TD-SCDMA) and time division code division multiple access (TD-CDMA) environments. To effectuate amplification in such a wireless environment, a communication schedule published by a base station can be received by a repeater and employed to configure an amplifier. Thus, for example, the repeater can include and utilize functionality that is similar to functionality existent in user terminals to recognize and receive the schedule. Thereafter, the received schedule can be employed in connection with configuring amplifiers to amplify signals transmitted between the base station and the mobile unit. More particularly, the amplifiers can be configured to amplify communications in a forward link direction and a reverse link direction that occur in accordance with the schedule. The repeater can thus appropriately amplify signals that are transmitted in a TDD environment without oscillating and without causing interference to occur within such environment. Utilization of the repeater enables base station coverage area to increase and/or enables holes in coverage areas to be filled. The repeater can be employed to amplify communications between a base station and a plurality of user terminals, wherein the user terminals can be cellular phones, smart phones, personal digital assistants, laptop computers, desktop computers, wristwatches, a combination thereof, and the like.

In accordance with an aspect described herein, a method for bi-directionally amplifying communications between a base station and a user terminal in a TDD wireless environment comprises providing a repeater with a TDD communications schedule between the base station and the user terminal, and selectively amplifying communications in one or more of a forward link direction and a reverse link direction based at least in part upon the schedule. Sensors can be associated with the repeater such that the sensors obtain data relating to position of the repeater, and the schedule can be altered as a function of the obtained data. Furthermore, an amplifier associated with the repeater can be configured to amplify received communications in the forward link direction and/or the reverse link direction. Similarly, one or more amplifiers can be dedicated to amplify communications in the forward link direction and the reverse link direction, and power can be provided to such amplifiers as a function of the schedule.

In accordance with another aspect, a method for configuring a repeater in a TDD wireless communication environment involves associating the repeater with functionality similar to that associated with a user terminal, utilizing the functionality to receive a schedule of communications in a TDD wireless environment, and amplifying received signals according to the received schedule. The method can further include automatically adjusting the schedule as a function of location of the repeater with respect to one or more of a base station and a user terminal.

In accordance with yet another feature described herein, a repeater apparatus includes systems that receive a communications schedule between a base station and a user terminal in a TDD environment and an amplifier or the like for amplifying signals as a function of the received schedule. The apparatus can further include a sensor that can sense parameters associated with the repeater apparatus and one or more amplifiers that can amplify the signals as a function of the sensed parameters such that the sensed parameters are one or more of location of the repeater apparatus, velocity associated with the repeater apparatus, acceleration associated with the repeater apparatus, direction of travel associated with the repeater, and elevation of the repeater apparatus. Furthermore, the apparatus can include one or more components that can configure a first amplifier to amplify signals in a forward link direction and configure a second amplifier to amplify signals in a reverse link direction, as well as configuring components that can configure an amplifier to amplify signals in a forward link direction and a reverse link direction as a function of the schedule.

In accordance with still yet another aspect, a repeater apparatus for utilization in a TDD wireless environment includes a scheduling component that can determine a communication schedule between a base station and a user terminal in the TDD wireless environment and an amplifier that can amplify communications between the base station and the user terminal, wherein the communication is a voice signal, a computer-related data signal, or a combination thereof.

In another aspect, a repeater that facilitates communication in a wireless environment includes a scheduling component that analyzes a schedule relating to when communications are active in the forward link direction and when communications are active in the reverse link direction—the communications are subject to time division duplexing. An amplifier can then amplify received communications as a function of the schedule. The repeater can further include an interface component that monitors communications between a base station and a user terminal and detects transmission of the schedule, and can still further comprise a configuration component that configures the amplifier to amplify the received communications in one or more of a forward link direction and a reverse link direction, wherein the configuration component selectively couples an RF switch to an appropriate amplifier stage as a function of the schedule.

In yet another aspect described in greater detail herein, a system that facilitates communication in a wireless environment includes a base station that publishes a schedule for communications with a user terminal in accordance with a TDD protocol and a repeater that receives the schedule and amplifies communications between the base station and the user terminal in accordance with the schedule.

In still yet another aspect, a repeater that facilitates amplification of signals in a wireless communication environment includes an antenna that is tuned to receive a communication schedule between a base station and a user terminal, the schedule is in conformance with a TDD protocol. An amplifier associated with the antenna can then be configured to amplify signals received by the antenna as a function of the communication schedule. The repeater can further include a data store that retains the received schedule and a processor that facilitates configuration of the amplifier in accordance with the communication schedule.

Moreover, in another aspect, a computer-readable medium can have computer-executable instructions for recognizing control instructions published by a base station relating to a communication schedule between the base station and a user terminal, wherein the schedule is in conformance with a TDD protocol, and configuring an amplifier to amplify a signal that is desirably transmitted between the base station and the mobile unit as a function of the control instructions. In still yet another aspect, a microprocessor can execute instructions for amplifying a signal, the instructions comprising recognizing a communications schedule in a TDD wireless environment, and configuring an amplifier in accordance with the recognized communications schedule.

To the accomplishment of the foregoing and related ends, one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
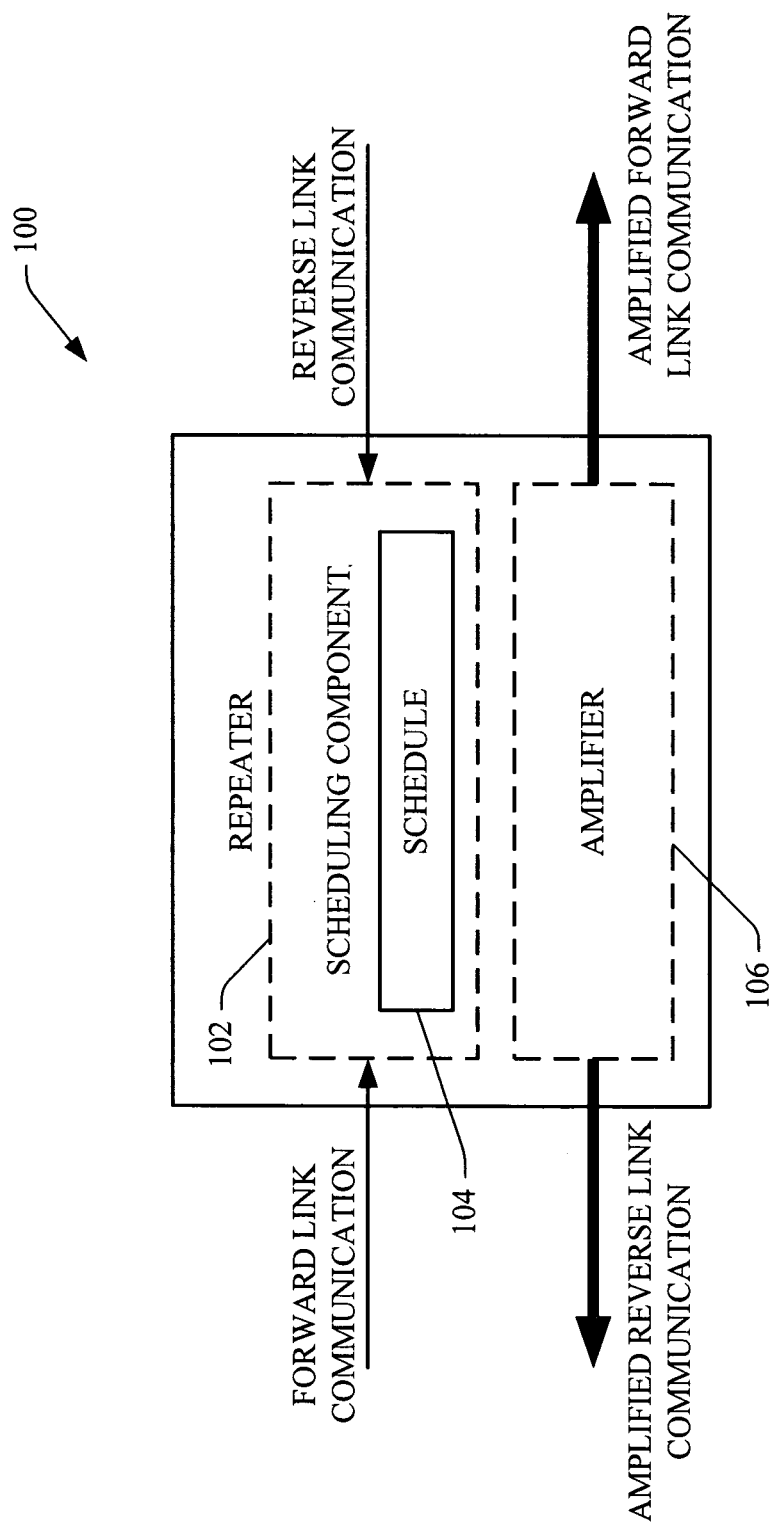
FIG. 1 is a high-level block diagram of a repeater that can be utilized in a TDD environment.

Various embodiments are now described with reference to the drawings, wherein like reference numerals are used to refer to like elements throughout. In the following description, for purposes of explanation, numerous specific details are set forth in order to provide a thorough understanding of various aspects described herein. It may be evident, however, that such aspects may be practiced without these specific details. In other instances, well-known structures and devices are shown in block diagram form in order to facilitate describing these aspects.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components may reside within a process and/or thread of execution and a component may be localized on one computing device and/or distributed between two or more computing devices (e.g., which can be resident upon a mobile unit). Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Referring now to the drawings, FIG. 1 illustrates a high-level diagram of a repeater that can be employed in a Time Division Duplex (TDD) environment. More particularly, FIG. 1 illustrates a repeater 100 that can receive and amplify communications in both forward and reverse link directions, wherein forward link (or downlink) refers to a link from a fixed location such as a base station to a user terminal, and a reverse link (or uplink) refers to a link from a user terminal to a base station. Conventionally, repeaters in TDD communication environments, such as Time Division Synchronous Code Division Multiple Access (TD-SCDMA), have not been realized, as amplifying in one direction (e.g., a reverse link or forward link direction) would adversely affect communications in an opposite direction. Repeater 100 enables amplification of communications in TDD environments by way of employing a scheduling component 102 that is aware of communications that will occur between a base station and a user terminal. For example, scheduling component 102 can include functionality similar to that existent within user terminals, as user terminals within TDD communications environments are aware of a transmission schedule between itself and a base station.

In one example, scheduling component 102 can receive a schedule 104 that is published by a base station and will be utilized in connection with a user terminal. In more detail, a base station will communicate with a user terminal in accordance with schedule 104 received by scheduling component 102. Generally, in TDD environments, time slots of varying size are scheduled to enable communication within such environments. These time slots typically are of milliseconds in length, and can alter according to needs of devices within the communication environment. For example, if it becomes apparent that optimizing communication between a user terminal and a base station necessitates providing a greater amount of time (e.g., a greater amount of time within time slots) to communications in a reverse link direction, the base station can determine a schedule and provide it to the user terminal. In accordance with a related aspect, communications can be scheduled by way of defining a length of time slots in both a forward and reverse direction, and scheduling is undertaken by way of defining a number of slots in each direction. Any suitable manner of scheduling in a TDD environment, however, is contemplated and intended to fall under the scope of the hereto-appended claims. Scheduling component 102 can receive schedule 104, which is substantially similar to a schedule of communications provided to a user terminal. For instance, a schedule published by a base station can be detected by scheduling component 102 through analysis of signals received by such scheduling component 102. More particularly, a base station can indicate that a schedule is being delivered through utilization of a code or series of codes, and scheduling component 102 can detect such code(s) to receive schedule 104. Accordingly, scheduling component 102 can include various signal reception components, such as antennae, to receive schedule 104, and can further include and/or be associated with a processor in order to enable recognition and analysis of schedule 104. For example, a Universal Mobile Telecommunication System Trrestrial Radio Access Network (UTRAN) portion of a network in a TD-CDMA environment can be charged with scheduling in such environment.

Repeater 100 further includes at least one amplifier 106 that amplifies communications within a TDD environment according to received schedule 104. For example, if schedule 104 indicates that communications will occur in a forward link direction for a first time slot and thereafter communications will occur in a reverse link direction for a second time slot, amplifier 106 can be pre-configured to amplify in an appropriate direction according to schedule 104. Amplifier 106 can be configured in a myriad of disparate manners without deviating from contemplations of the inventors with respect to various novel features described herein. For instance, amplifier 106 can be one or more amplifiers that are configured to amplify communications in both forward link and reverse link directions. More specifically, switching techniques can be employed to reverse polarity of amplification provided by amplifier 106. In a related aspect, amplifier 106 can include a plurality of amplifiers, wherein a first set of amplifiers is employed to amplify communications in a forward link direction and a second set of amplifiers is employed to amplify communication in a reverse link direction. For example, power can be intermittently provided to the first and second set of amplifiers according to schedule 104. Any suitable configuration of amplifiers, however, can be utilized in connection with repeater 100.

The following provides an exemplary utilization of repeater 100 in a TDD wireless communications environment. A base station publishes a schedule for communications with a user terminal, and repeater 100 obtains such schedule. The base station and user terminal then communicate over a prescribed frequency, code channel, transmission medium, etc. intermittently according to schedule 104. For example, the base station can communicate in a forward link direction over a first scheduled time slot to the user terminal, and thereafter the user terminal can communicate with the base station over a second scheduled time slot in the reverse link direction to the base station. Scheduling component 102 is aware of schedule 104, and assists in configuring amplifier 106 according to such schedule 104. Thus, repeater 100 can receive communications in a forward link direction and amplify such communications, and can similarly receive communications in a reverse link direction and amplify such communications. Moreover, repeater 100 does not simultaneously amplify the frequency band carrying the communications in both directions—thus, repeater 100 does not oscillate and unwanted interference is not created within wireless TDD environments. In accordance with one aspect, repeater 100 may have knowledge of at least a majority of schedules with respect to mobile units within coverage area of a base station communication with repeater 100. Thus, in one example, if there are multiple users in a forward link coverage area of repeater 100, scheduling component 102 can have access to a schedule for each of the users. Furthermore, repeater 100 can receive schedule 104 by any suitable manner, including through wireless communication lines, wired communication lines (e.g., telephone lines, cable lines, fiber optic lines, . . . ), or a combination of wireless and wired communication lines.

Repeater 100 can be utilized in any suitable communications environment that utilizes time-division duplexing for bi-directional communications between devices. For instance, repeater 100 can be employed in a cellular telephone context. Furthermore, repeater 100 can be utilized in connection with emergency transmission devices that operate on a substantially similar frequency. Moreover, repeater 100 can be utilized in connection with computer data transmittal. Accordingly, it is understood from the above examples that repeater 100 can be employed in any suitable wireless environment or context where a schedule is utilized for communication over a prescribed frequency.

Figure 2:
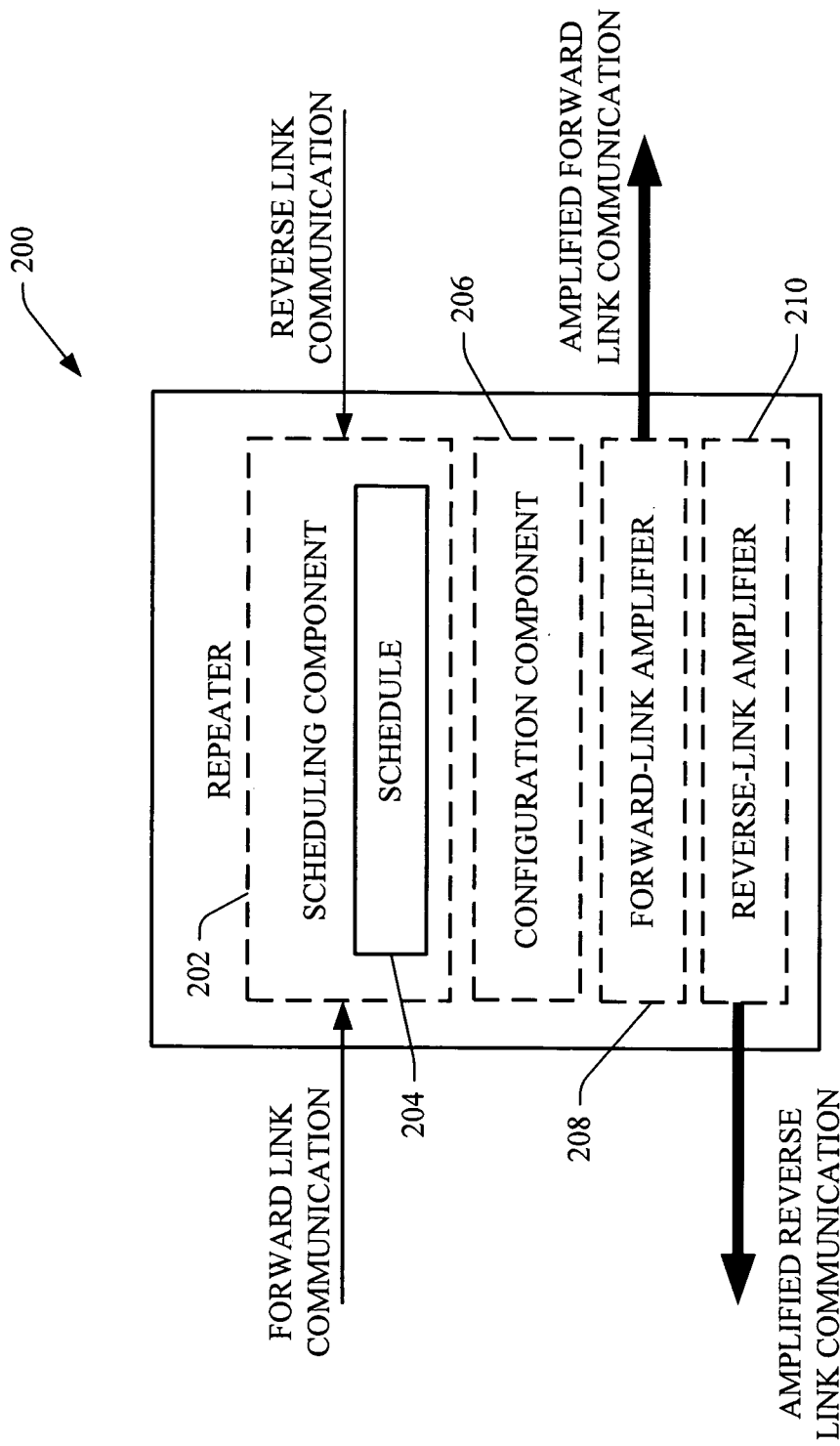
FIG. 2 is a block diagram of a repeater that can be utilized in a TDD environment, wherein the repeater includes multiple amplifiers that can be configured to amplify in the forward link and the reverse link directions, respectively.

Turning now to FIG. 2, a repeater 200 that can be employed within a TDD wireless communications environment is illustrated. Repeater 200 includes a scheduling component 202 that receives a schedule 204 that describes times that communications occur in a forward link direction and a reverse link direction. Repeater 200 can obtain schedule 204 by monitoring a frequency, code channel, data path, etc. that a base station and a user terminal are utilizing for communications, wherein schedule 204 is published upon the aforementioned frequency, code channel and/or data path. Furthermore, repeater 200 can monitor a code channel (e.g., within a CDMA-related system), a data path available from a base station, or any other suitable transmission entity and/or technique to obtain schedule 204. Scheduling component 202 can analyze the received schedule (e.g., through utilization of a processing device) and communicate with a configuration component 206. More particularly, scheduling component 202 can direct configuration component 206 to configure amplifiers within repeater 200 according to the schedule. Thus, amplifiers will amplify in a forward link direction when communications are traveling in such a direction, and amplifiers will amplify in a reverse link direction when communications are traveling in the reverse link direction.

Repeater 200 includes a forward link amplifier 208 and a reverse-link amplifier 210, wherein amplifiers 208 and 210 can be tasked to amplify communications traveling in a respective direction according to schedule 204. For example, configuration component 206 can cause power to be intermittently provided to forward link amplifier 208 and reverse-link amplifier 210 in accordance with schedule 204. For instance, configuration component 206 can cause switches to be opened or closed to cause amplification in a desired direction. In operation, repeater 200 receives schedule 204 from the base station in a manner substantially similar to how a user terminal receives schedule 204. Communications can then ensue between the base station and the user terminal in accordance with schedule 204. Scheduling component 202 can analyze schedule 204 and communicate with a configuration component 206 with respect to configuring forward link amplifier 208 and reverse link amplifier 210 as a function of schedule 204. Thus, forward link communications can be received by repeater 200, and such communications can be amplified by repeater 200. Similarly, reverse link communications can be received and amplified by repeater 200 without oscillating and/or causing interference in a wireless system.

Figure 3:
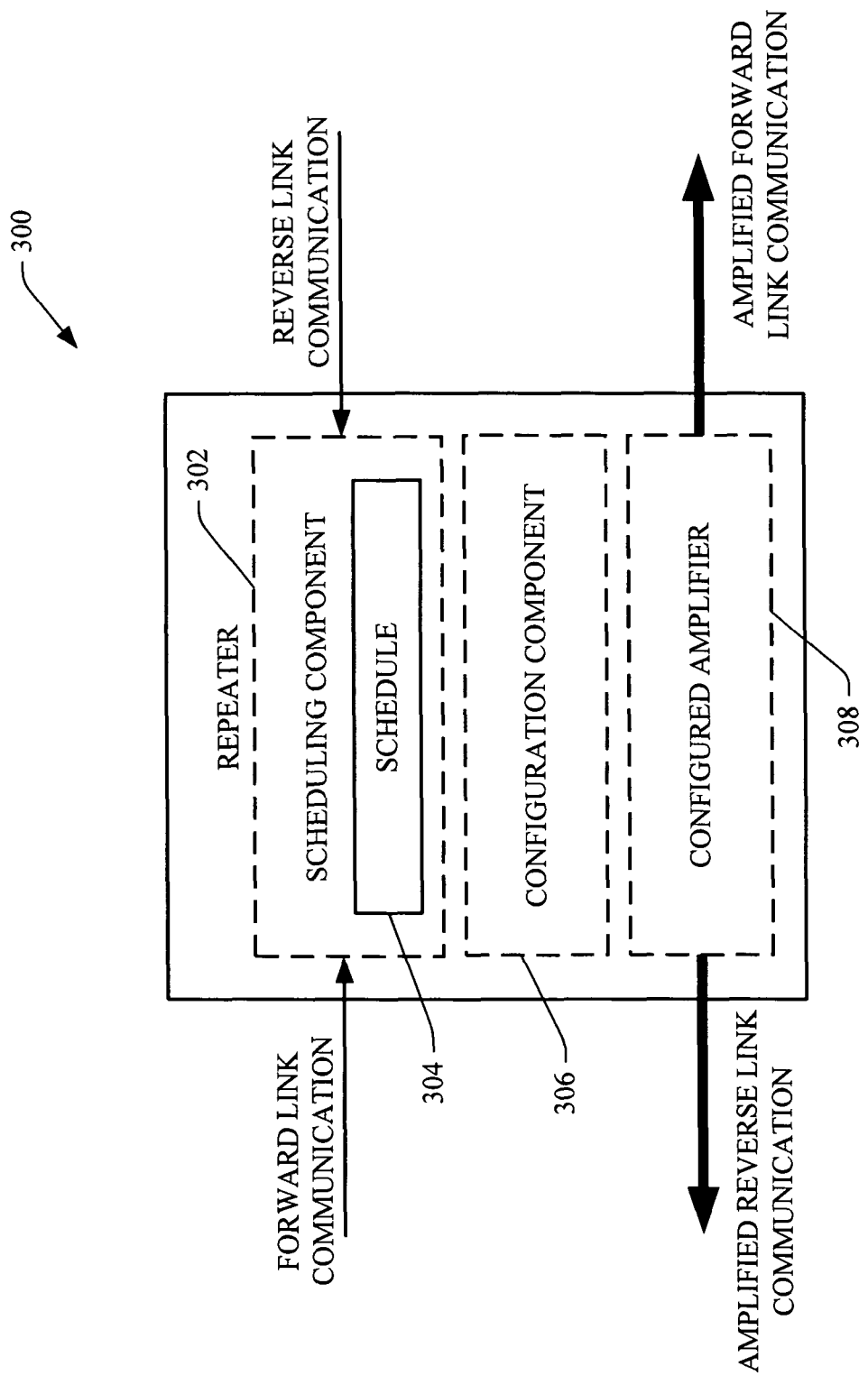
FIG. 3 is a block diagram of a repeater that can be utilized in a TDD environment, wherein the repeater includes one or more amplifiers that are selectively configured to amplify signals in an appropriate direction.

Turning now to FIG. 3, a repeater 300 that can be employed in a TDD wireless communications environment is illustrated. Repeater 300 is utilized to extend coverage range of a base station in a TDD environment. Repeater 300 includes a scheduling component 302 that receives a schedule 304 from a base station relating to time slots in which communications can occur in a forward link direction and a reverse link direction between the base station and the user terminal. Schedule 304 can be received in a manner substantially similar to a manner in which a user terminal receives a communications schedule in a TDD environment. Thus, control channel information (e.g., schedule 304) available to a user terminal can be made available to scheduling component 302.

Scheduling component 302 can analyze schedule 304 and communicate with a configuration component 306 results of the analysis. For example, scheduling component 302 can inform configuration component 306 of precise times in which communications will be traveling in a forward link direction and a reverse link direction. Furthermore, scheduling component 302 can inform configuration component 306 of guard time slots (blank periods between time slots scheduled for forward link communications and time slots scheduled for reverse link communications), where no communication exists in either direction. Configuration component 306 can then configure an amplifier 308 or set of amplifiers within repeater 300 according to schedule 304. This enables a same amplifier or set of amplifiers to amplify communications and/or signals in both forward link and reverse link directions. For example, configuration component 306 could employ RF switches to connect amplifier stages in an appropriate direction (e.g., a forward link direction or a reverse link direction).

In operation, scheduling component 302 can receive schedule 304 from a base station, wherein schedule 304 can be analyzed to determine when communications will occur between the base station and a user terminal in a forward link direction and a reverse link direction. Scheduling component 302 can relay scheduling information to configuration component 306, which can thereafter provide instructions to amplifier 308 regarding when to alter configuration of a switch associated therewith. Repeater 300 can receive forward link communications according to schedule 304, and amplifier 308 is configured to amplify the communications in the appropriate direction. Similarly, repeater 300 can receive communications in a reverse link direction as prescribed by schedule 304, and amplifier 308 is configured to amplify the communications in the appropriate direction.

Figure 4:
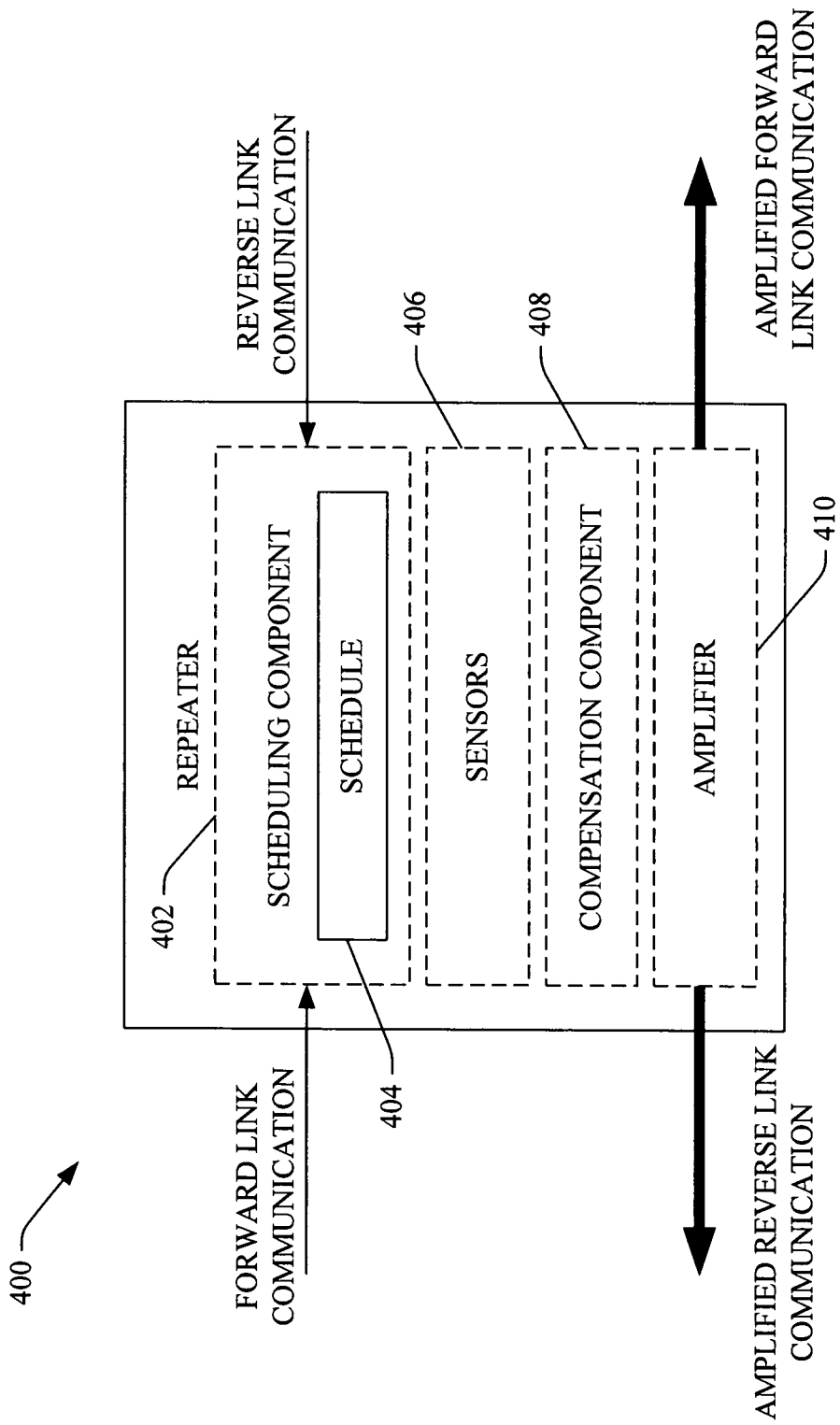
FIG. 4 is a block diagram of a repeater that can be utilized in a TDD environment, wherein the repeater can adjust a communication schedule according to parameters sensed with respect to the repeater.

Turning now to FIG. 4, a repeater 400 that can be utilized in a TDD environment is illustrated, wherein repeater 400 is employed to amplify communications in both a forward link direction and a reverse link direction without causing interference. Repeater 400 includes a scheduling component 402 that receives a schedule 404 from a base station, wherein schedule 404 is informative as to when communications are to be delivered in a forward direction and when communications are to be delivered in a reverse direction. Scheduling component 402 can, for example, operate as a user terminal to receive schedule 404. Repeater 400 can further include one or more sensors 406 that sense parameters associated with repeater 400. For example, repeater 400 can be resident upon a moving entity, such as an automobile, train, plane, and the like, and sensors 406 can be employed to determine a location of repeater 400 with respect to a base station and/or a user terminal, speed of travel, acceleration, direction of travel, etc. For instance, sensors 406 can include a Global Positioning System (GPS) sensor or other suitable location-related sensor, as well as speedometers, accelerometers, and the like.

Scheduling component 402 can relay schedule 404 to a compensation component 408, which also receives parameters obtained by way of sensors 406. Compensation component 408 can compensate for location and mobility of repeater 400 and/or a user terminal to configure an amplifier 410 so that such amplifier 410 selectively amplifies communications received by repeater 400. In more detail, due to delays associated with transmission of communications over a geographic distance, if repeater 400 is mobile schedule 404 may not be able to be strictly complied with. Rather, slight adjustments may be necessary to desirably amplify communications in a TDD environment between a base station and a user terminal. For a specific example, as repeater 400 is moved further from a base station, a communication will require a greater amount of time to be transferred from the base station to the repeater. Without compensation component 408, strict adherence to the schedule to configure amplifier 410 could result in less than optimal performance of repeater 400. Compensation component 408, however, given schedule 404 and sensed parameters, can dynamically make adjustments to configuration of amplifier 410 to facilitate optimal performance of repeater 400. Furthermore, in addition to sensed parameters, compensation component 408 can have access to information relating to geographic location of a base station as well as parameters relating to a user terminal, such as location, direction of movement, and the like. Mobile repeater 400 can thus receive communications in both a forward link direction and a reverse link direction and selectively amplify the communications without causing interference in a wireless environment.

Figure 5:
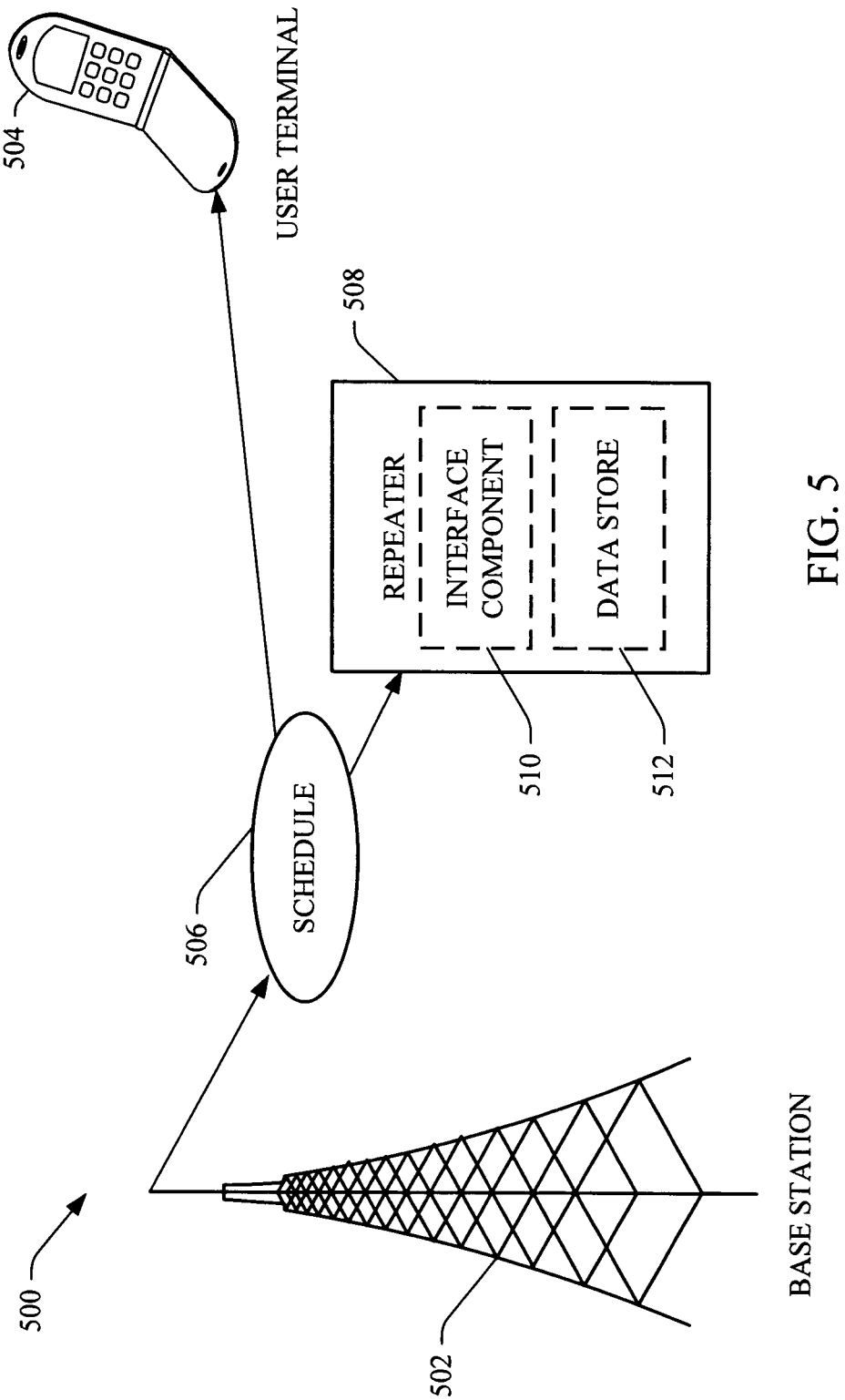
FIG. 5 is a system that facilitates communication in a TDD environment.

Now referring to FIG. 5, a system 500 that facilitates selectively amplifying communications in a TDD wireless communications environment is illustrated. System 500 includes a base station 502 that communicates with a user terminal 504. While shown to be a mobile telephone, it is understood that user terminal 504 can be any suitable voice or data reception device, such as a personal digital assistance, a laptop computer, a smart phone, a wristwatch, a desktop computer, etc. Base station 502 outputs control information that informs user terminal 504 when communications will travel in a forward direction and when communications will travel in a reverse direction between base station 502 and user terminal 504. The control information is hereinafter referred to as a schedule 506. Schedule 506 is received by user terminal 504 and is also received by a repeater 508. Repeater 508, for example, can include functionality similar to that in user terminal 504, thereby enabling receipt and understanding of schedule 506.

An interface component 510 can be associated with repeater 508 to facilitate receipt of schedule 506. For instance, interface component 510 can be an antenna, software that enables receipt and analysis of the schedule, etc. Repeater 508 can further include a data store 512 to enable storage of schedule 506. Data store 512 can be of any suitable format, including, RAM, EPROM, EEPROM, any suitable disk structure, and the like. Upon receiving and analyzing schedule 506, repeater 508 can amplify communications between base station 502 and user terminal 504 in both the forward and reverse link directions without causing interference within system 500.

Figure 6:
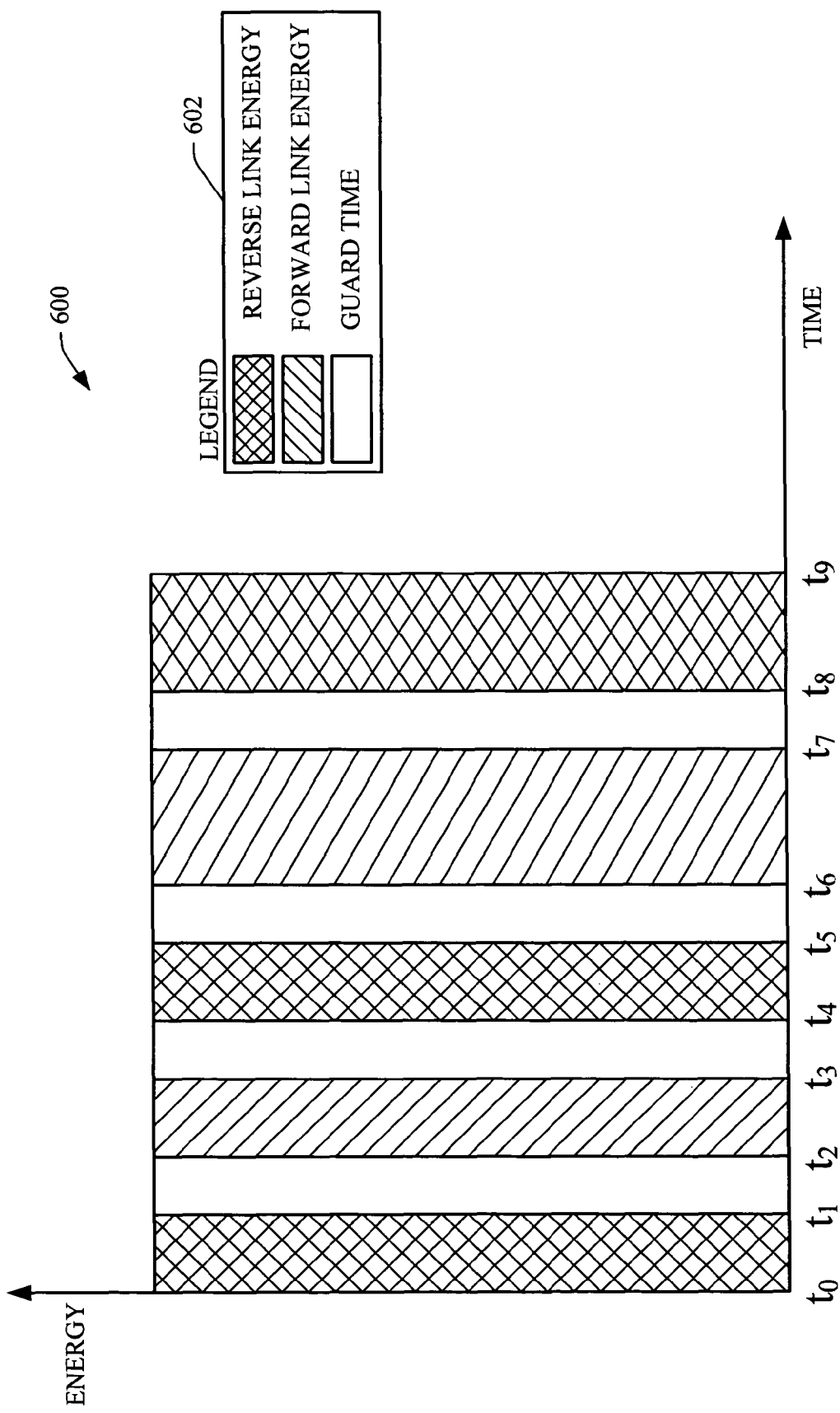
FIG. 6 is a graph that illustrates a schedule that can be employed in a TDD environment.

Now referring to FIG. 6, a graph 600 that exemplifies a schedule with respect to time and energy, wherein graph 600 can exist within a TDD wireless environment, is illustrated. Graph 600 includes time slots that are scheduled for communications in a forward link direction (e.g., from a base station to a user terminal), time slots that are scheduled for communications in a reverse link direction (e.g., from a user terminal to a base station), and time slots that are scheduled as guard times (e.g., buffer time slots where no communication is to occur). As discussed above, in a TDD wireless environment communications occur in both directions (forward link and reverse link) over a substantially similar center RF frequency. Accordingly, to effectively communicate between a base station and user terminal, communications should not simultaneously occur in both directions.

For example, between times $t_0$ and $t_1$, communications are scheduled to occur in a forward link direction. Between times $t_1$ and $t_2$, a guard band time is scheduled to aid in avoiding collisions (data/signals simultaneously traveling in disparate directions over one frequency). Between times $t_2$ and $t_3$, communications are scheduled to occur in a reverse link direction, and between times $t_3$ and $t_4$, a guard band time is scheduled. As can be easily discerned from graph 600, forward link communications are also scheduled between times $t_4$ and $t_5$ and between times $t_8$ and $t_9$. Similarly, a reverse link communication is scheduled between times $t_6$ and $t_7$, and guard band time slots are scheduled between time slots scheduled for forward link communications and time slots scheduled for reverse link communications. A schedule such as the one exemplified by graph 600 can be utilized in a repeater within a TDD wireless communications environment to determine when to amplify communications in a forward link direction and a reverse link direction. A legend 602 is provided to aid in analysis of graph 600.

Figure 7:
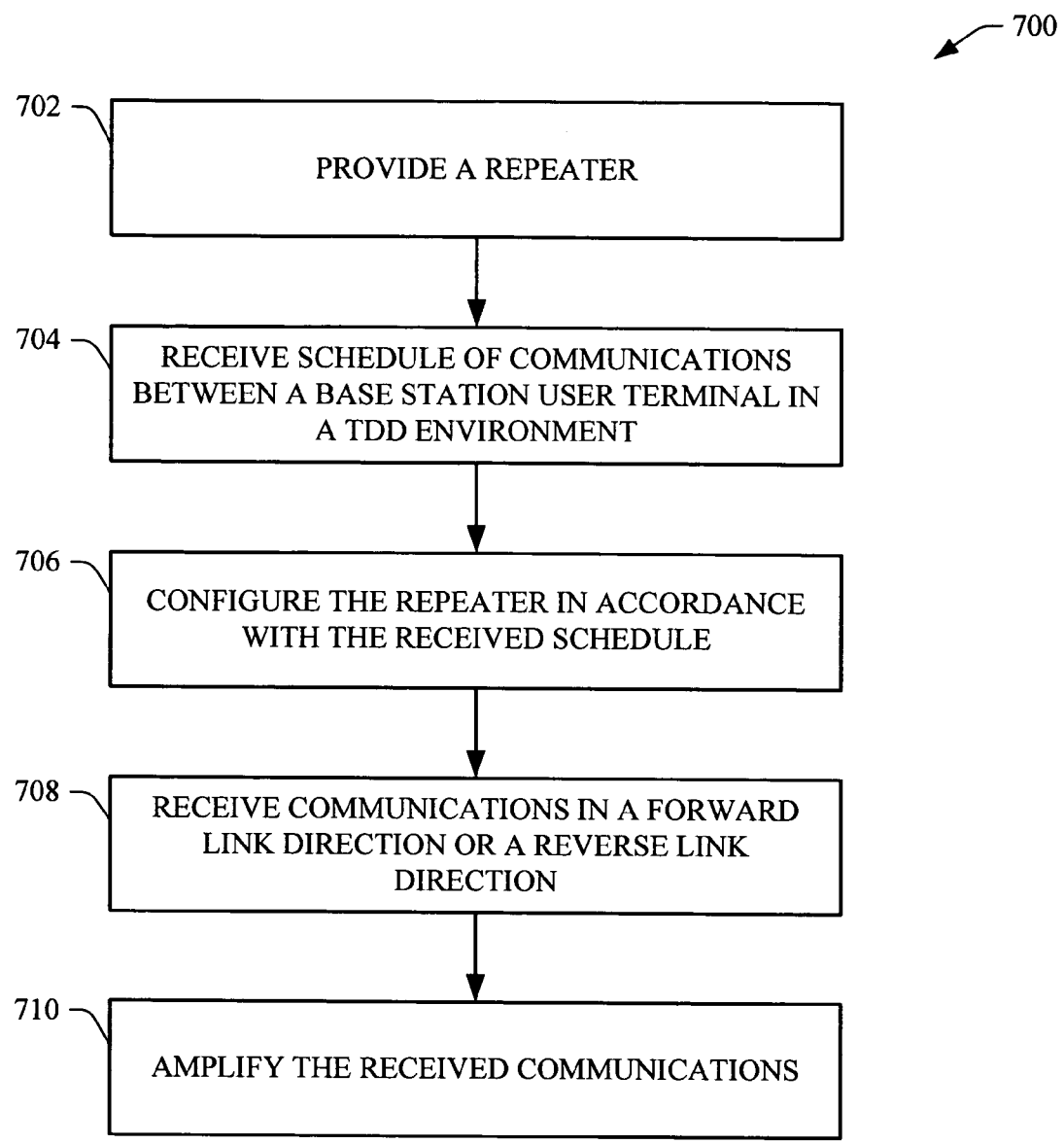
FIG. 7 is a representative flow diagram illustrating a methodology for utilizing a repeater in a TDD environment.
Figure 8:
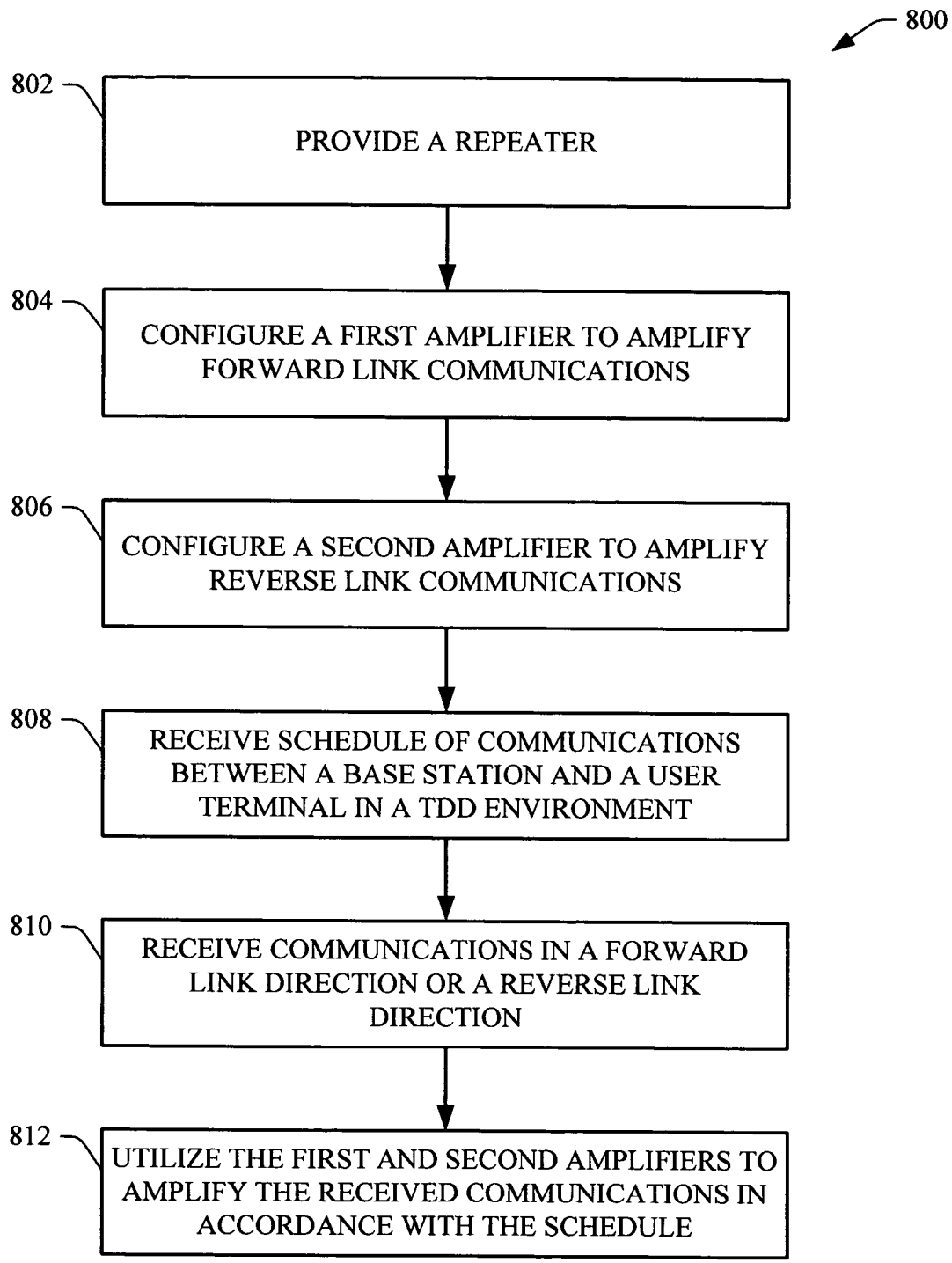
FIG. 8 is a representative flow diagram illustrating a methodology for configuring amplifiers in a repeater for utilization in a TDD environment.
Figure 9:
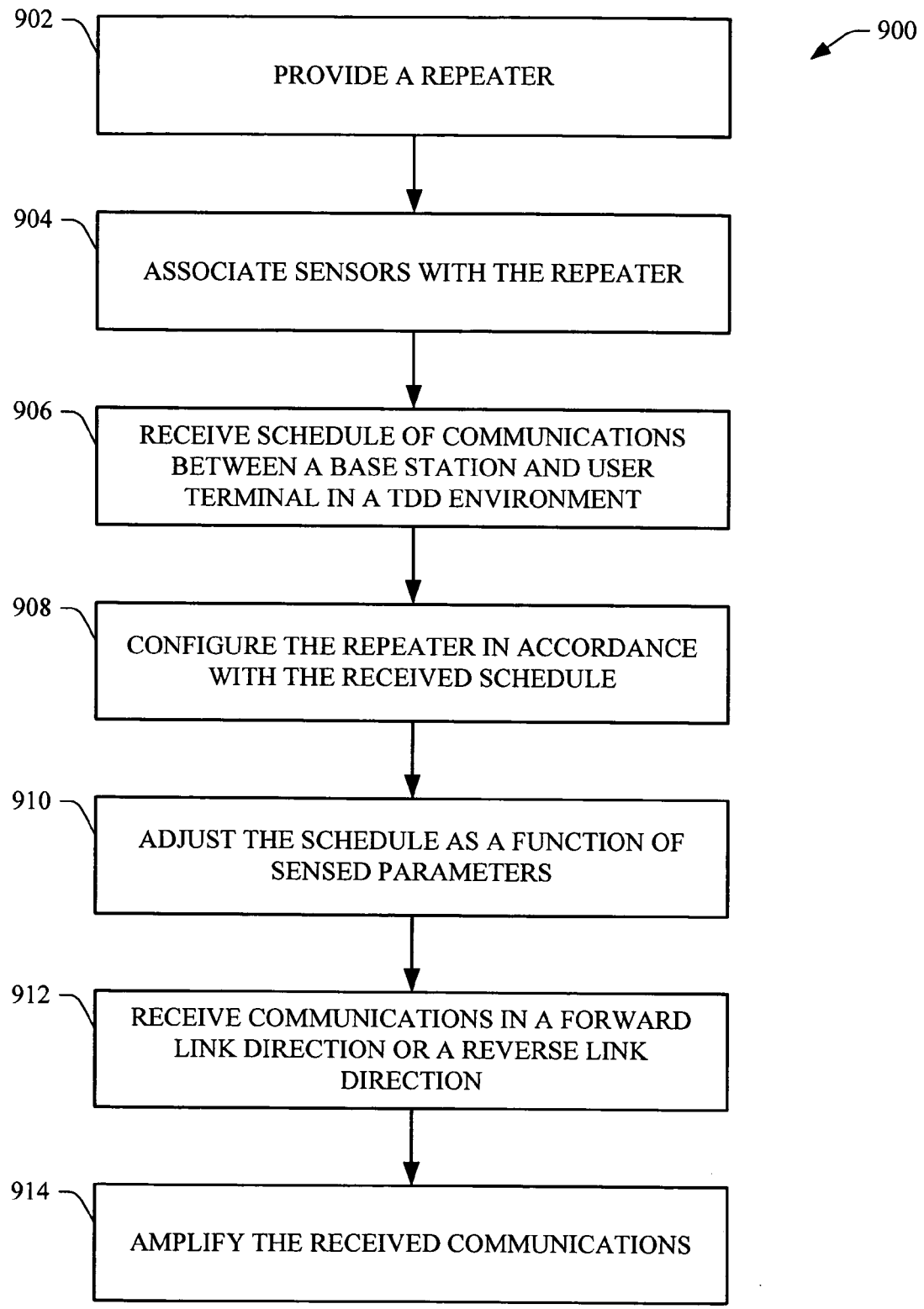
FIG. 9 is a representative flow diagram illustrating a methodology for adjusting a communication schedule received by a repeater as a function of parameters associated with such repeater.

Referring to FIGS. 7-9, methodologies relating to intermittently amplifying communications in a TDD wireless communications environment by way of a repeater are illustrated. While, for purposes of simplicity of explanation, the methodologies are shown and described as a series of acts, it is to be understood and appreciated that the methodologies are not limited by the order of acts, as some acts may, in accordance with these methodologies, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement the following methodologies.

Referring now solely to FIG. 7, a methodology 700 for utilizing a repeater in a TDD wireless communications environment is illustrated. At 702, a repeater is provided, wherein the repeater can include memory that is utilized for storage of data relevant to amplification of communications within the wireless environment. The repeater can further include a processor and corresponding circuitry to configure one or more amplifiers to ensure amplification of signals/data in a desired direction (e.g., in a forward link direction or a reverse link direction). At 704, a schedule of communications between a base station and a user terminal is received, wherein the communications are delivered in conformance with a TDD protocol, such as TD-SCDMA. The schedule is informative with respect to when communications are to occur in a forward link direction and a reverse link direction (and when guard times are scheduled). For instance, similar devices and/or functionality that is employed in user terminals can be associated with the repeater to facilitate reception of the schedule, and the memory within the repeater can be employed to at least temporarily store the schedule and/or a derivation thereof.

At 706, the repeater is configured in accordance with the received schedule. For example, a processor can be programmed to cause switches to operate at particular times in accordance with the schedule. At 708, communications in a forward link direction or a reverse link direction are received by the repeater, and at 710 the received communications are amplified. As the repeater is configured according to the communications schedule, amplification of communications will occur in an appropriate direction. Therefore, the repeater will not be subject to oscillation and will not generate interference within a wireless environment.

Now referring to FIG. 8, a methodology 800 for employing a repeater in a wireless environment is illustrated. At 802, a repeater is provided, wherein the repeater can include a processor and memory. The processor can be, for example, a microprocessor, a microcontroller, or any other suitable processing device. At 804, a first amplifier is configured to amplify communications in a forward link direction, and at 806 a second amplifier is configured to amplify communications in a reverse link direction. At 808, a schedule relating to communications between a base station and a user terminal is received, wherein the schedule at least includes information associated with times that communications will occur in a forward link direction and times that communications will occur in a reverse link direction. As described above, the repeater can include functionality and/or mechanisms that are similar to that within a user terminal to enable reception of the schedule.

At 810, communications are received by the repeater in a forward link direction or a reverse link direction. At 812, the first and/or second amplifiers are utilized to amplify the received communications in a proper direction in accordance with the schedule. For example, the first amplifier can be provided with power when communications are scheduled to occur in a forward link direction and deprived of power when communications are scheduled to occur in a reverse link direction. Similarly, the second amplifier can be provided with power when communications are scheduled to occur in a reverse link direction and deprived of power when communications are scheduled to occur in a forward link direction. Thus, communications between a base station and a user terminal in a TDD environment will be appropriately amplified, thereby extending coverage area of the base station.

Turning now to FIG. 9, a methodology 900 for utilizing a mobile repeater in a TDD wireless communications environment is illustrated. At 902, a repeater is provided, wherein the repeater is associated with an entity that is in motion or capable of being in motion (e.g., a plane, an automobile, . . . ). At 904, sensors are associated with the repeater, wherein the sensors can relate to various parameters relating to the repeater, such as location of the repeater, direction of travel of the repeater, speed of travel of the repeater, elevation of the repeater, and the like. Furthermore, the sensors can indicate a location of the repeater with respect to a base station and a user terminal.

At 906, a schedule for communications between a base station and a user terminal is received by the repeater, wherein the communications are to occur in a TDD-related environment, such as TD-SCDMA. At 908, the repeater is configured in accordance with the received schedule, thereby enabling amplification of communications to occur in appropriate directions. At 910, the schedule is adjusted in accordance with the sensed parameters. For instance, if the repeater is traveling away from a base station at a rapid rate of speed, timing associated with communications amplified by such repeater can be affected. Accordingly, the received schedule can be adjusted in light of such parameters. At 912, communications in a forward link direction or a reverse link direction are received, and at 914 the communications are amplified accordingly. Thus, utilizing the methodology 900, a repeater can be employed in a wireless TDD environment, wherein the repeater is mobile or subject to mobility.

Figure 10:
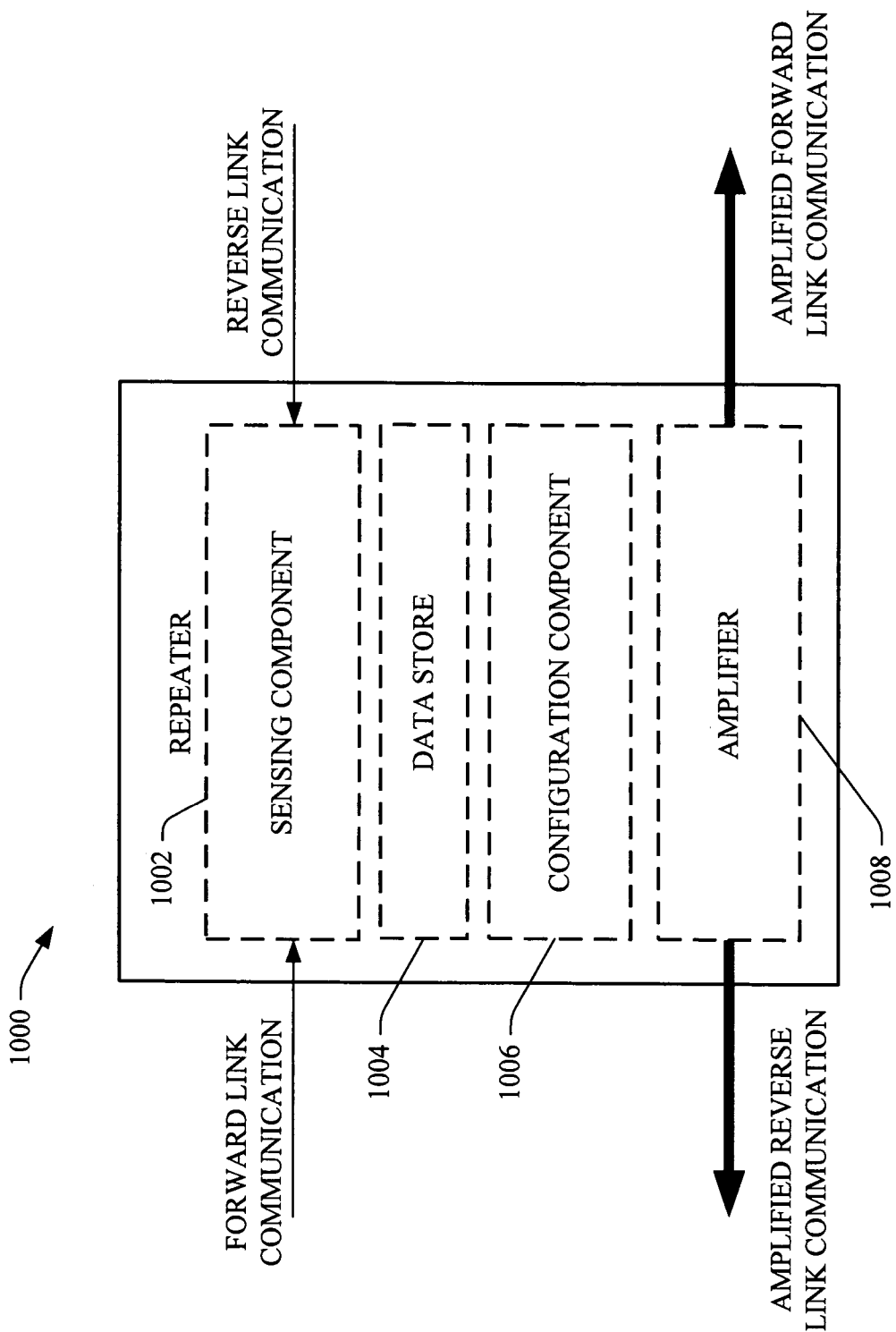
FIG. 10 is a repeater that can be utilized in a TDD environment.

Referring now to FIG. 10, a repeater 1000 that can be employed in a TDD wireless communication environment is illustrated. Repeater 1000 is employed to receive communications in a forward link direction and a reverse link direction and amplify such communications without oscillating or causing interference. Repeater 1000 includes a sensing component 1002 that monitors a frequency, code channel, data path, etc. for communications, and dynamically determines which direction the communications are traveling. Repeater 1000 further includes a data store 1004 that can be utilized to store received communications, thereby creating a time buffer. In more detail, the data store can continuously receive and temporarily store communications to account for sensing delays associated with sensing component 1002. For instance, determining that a received communication is traveling in a forward link direction and configuring an amplifier to desirably amplify the received communication can take a small portion of time. Data store 1004 enables amplification to occur on an entirety of a communication without reliance on a received schedule. In other words, repeater 1000 can dynamically amplify communications upon detection/analysis of a received signal.

Repeater 1000 can further include a configuration component 1006 that configures an amplifier 1008 upon sensing component 1002 sensing direction of a received communication. For example, configuration component 1006 can cause power to be applied to amplifier 1008, can cause an RF switch to be positioned in a particular manner, and the like. Amplifier 1008 can then amplify a received communication in an appropriate direction. In operation, repeater 1000 receives a communication in a forward link direction or a reverse link direction, and such communications are directed to data store 1004, which is employed as a buffer. Sensing component 1002 determines a direction of travel of the received communication, and informs configuration component 1006 of such direction. Configuration component 1006 configures amplifier 1008 according to the direction, and pulls communications from the data store (in a FIFO manner). Amplifier 1008 then amplifies the communications in the appropriate direction.

Figure 11:
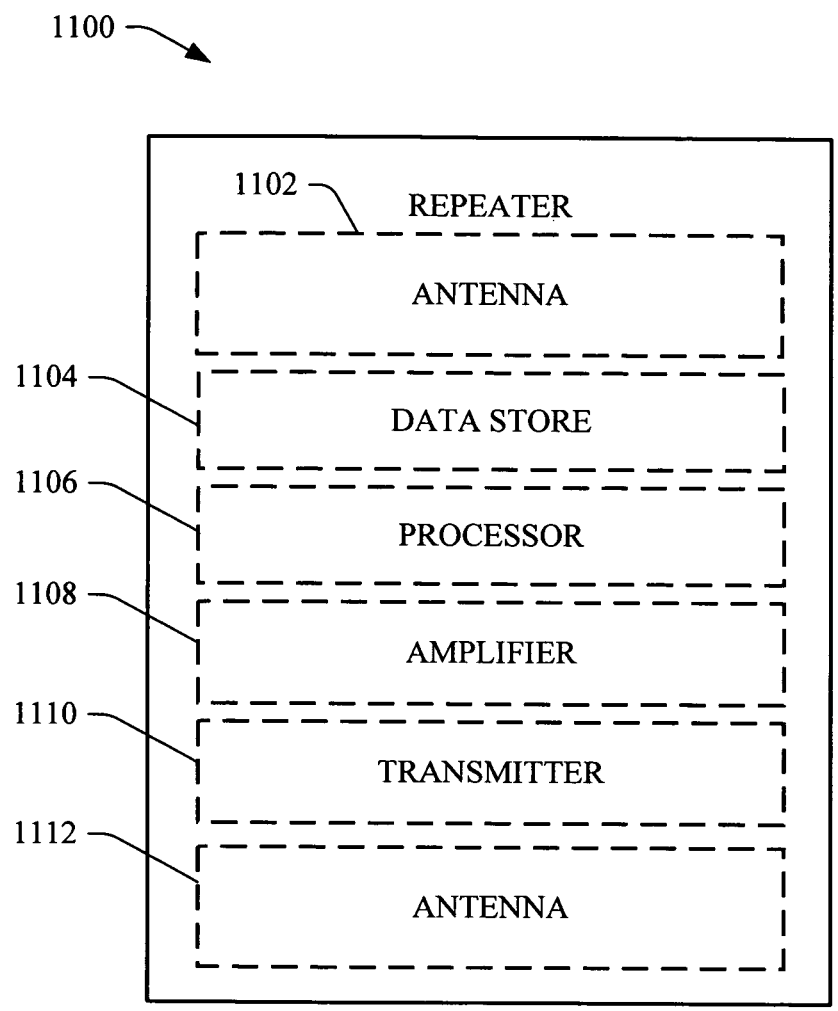
FIG. 11 is a block diagram of a repeater that can be employed in a TDD environment.

Now turning to FIG. 11, a repeater 1100 and physical components therein are illustrated, wherein repeater 1100 can be employed in a TDD wireless communication environment. Repeater 1100 includes an antenna 1102 that can be employed to receive a schedule with respect to communications that will occur between a base station and a user terminal. Antenna 1102 can also be employed to receive communications between the aforementioned base station and user terminal. For instance, antenna 1102 can be tuned to a frequency that is utilized for communications between the two aforementioned entities. While not shown as such, antenna 1102 can also be employed in connection with transmitting communications within a TDD environment. Repeater 1100 can further include a data store 1104 that is employed to retain the schedule received by antenna 1102. Moreover, data store 1104 can be utilized to store software associated with repeater 1100. Furthermore, data store 1104 can include volatile memory and nonvolatile memory, wherein the nonvolatile memory can include read only memory (ROM), programmable ROM (PROM), electrically programmable ROM (EPROM), electrically erasable ROM (EEPROM), or flash memory. Volatile memory can include random access memory (RAM), which is available in many forms, such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Moreover, data store 1104 can include and/or be associated with a disk drive. Thus, it is understood that any suitable data storage media is contemplated.

A processor 1106 can be employed to effectuate software stored within data store 1104 as well as analyze the received schedule and configure an amplifier 1108. For instance, amplifier 1108 can be configured in accordance with the received schedule. A transmitter 1110 can be utilized to transmit amplified signals to a desired entity, and an antenna 1112 can be employed in connection therewith. For instance, if the amplifier is configured to amplify communications in a forward link direction, then transmitter 1110 can output an amplified communication to a user terminal by way of antenna 1112.

Figure 12:
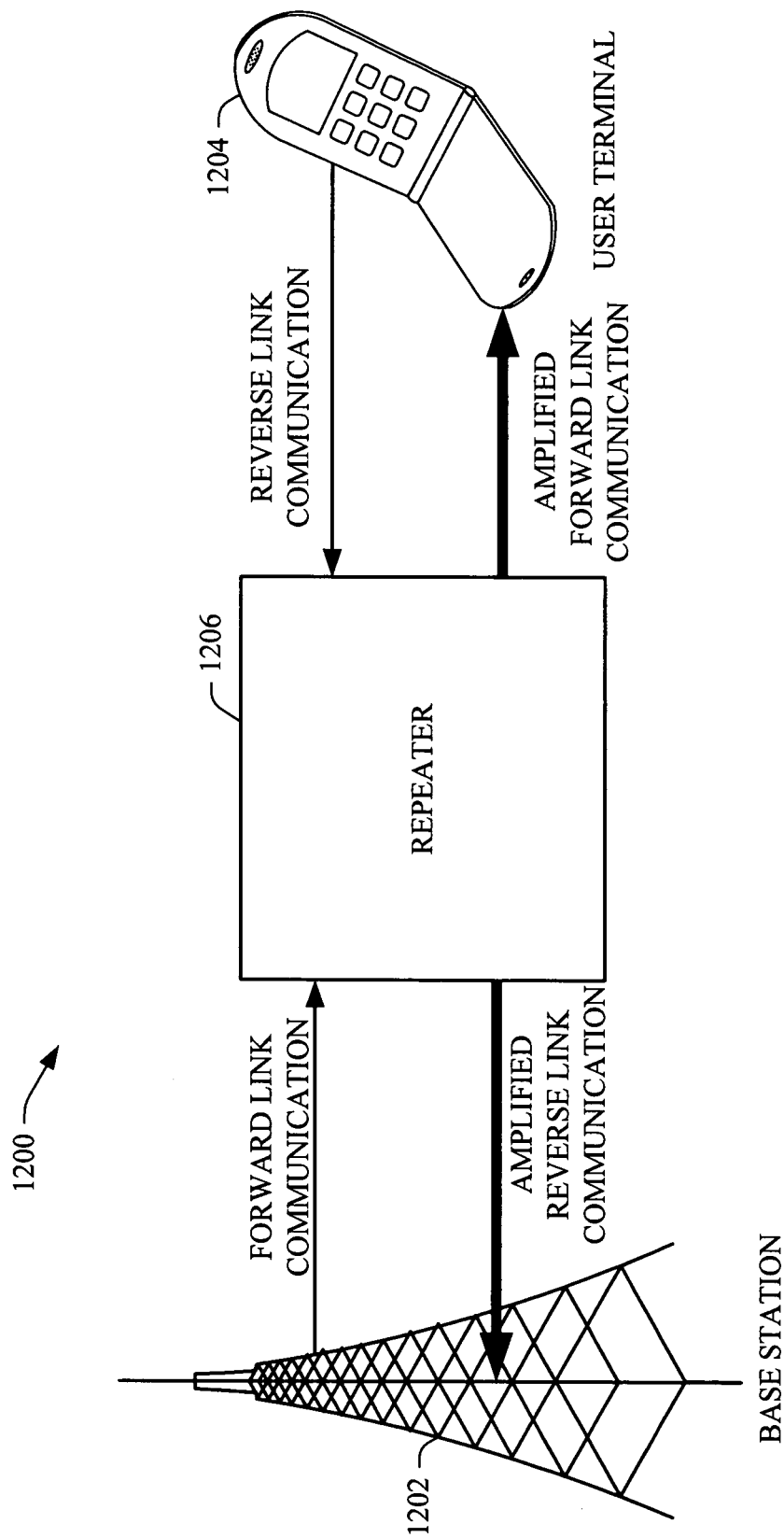
FIG. 12 is a system that facilitates bi-directional amplification of signals in a TDD environment.

Now referring to FIG. 12, a system 1200 that facilitates communication between a base station and a user terminal in a TDD wireless environment is illustrated. System 1200 includes a base station 1202 that transmits forward link communications to a user terminal 1204 and receives reverse link communications from user terminal 1204. Furthermore, base station 1202 determines and publishes a schedule to be received by user terminal 1204 that is utilized to determine time slots for occurrence of forward link communications and reverse link communications between base station 1202 and user terminal 1204. A repeater 1206 is utilized to amplify the communications in an appropriate direction. More specifically, repeater 1206 (which can include functionality described with respect to FIGS. 1-4) extends coverage of base station 1202 in a TDD wireless communications environment by amplifying communications between base station 1202 and the user terminal appropriately.

Figure 13:
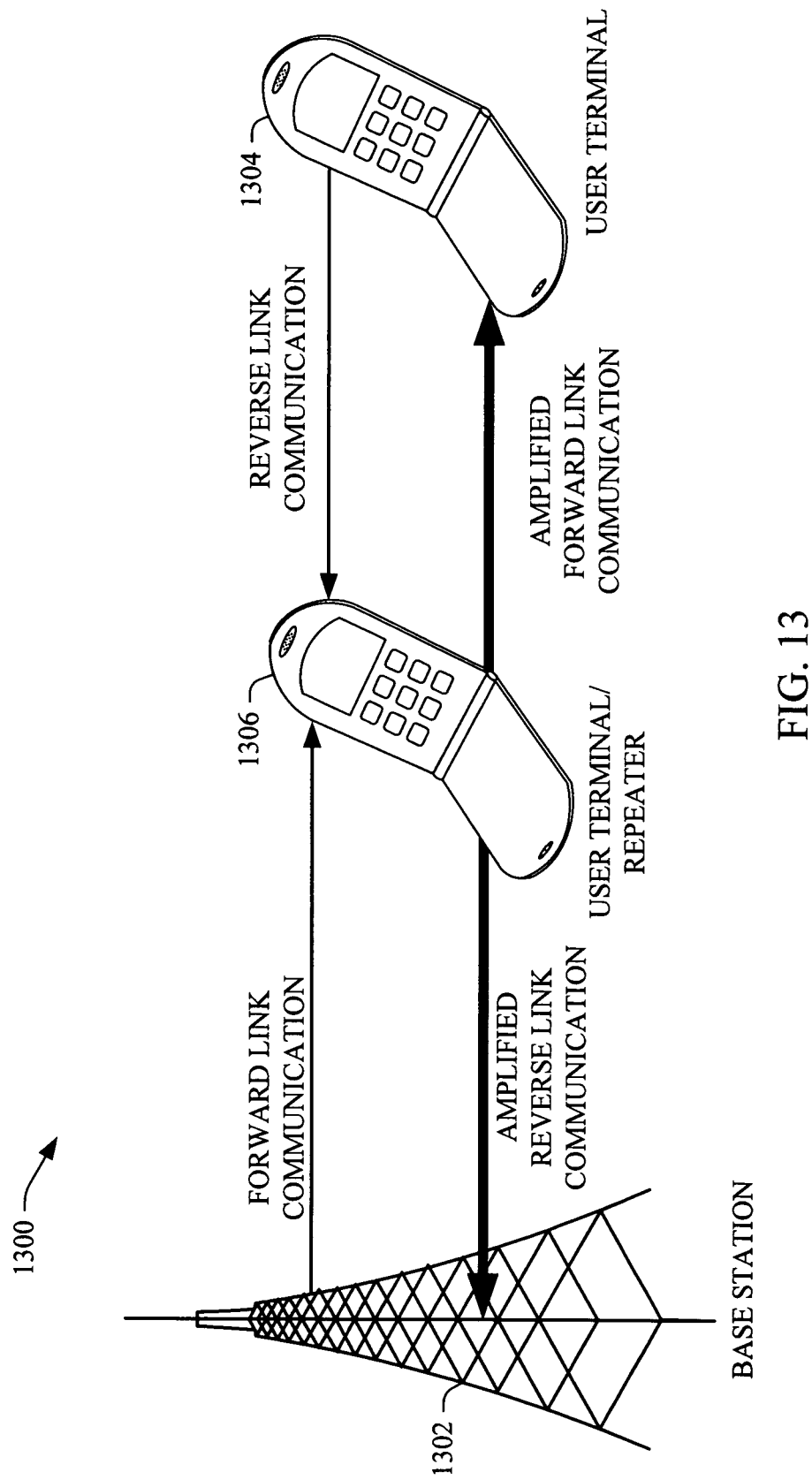
FIG. 13 is a system that facilitates use of a user terminal as a repeater in a TDD environment.

Turning now to FIG. 13, a system 1300 that facilitates communication between a base station and a user terminal in a TDD wireless environment is illustrated. System 1300 includes a base station 1302 that determines and publishes a schedule that is utilized for communications between base station 1302 and a user terminal 1304. User terminal 1304 receives the schedule, and communications are undertaken between base station 1302 and user terminal 1304 according to such schedule. A second user terminal 1306 can also receive the schedule and be employed as a repeater with respect to base station 1302 and user terminal 1304. For example, user terminal 1304 can include one or more amplifiers and employ battery power to amplify communications between base station 1302 and user terminal 1304 according to the published schedule. To effectuate utilization of user terminal 1306 as a repeater, user terminal can include multiple antennas—a first antenna for transmitting signals and a second antenna for receiving signals. In accordance with a related feature, user terminal 1306 can utilize a single antenna and amplify signals according to the received schedule in a manner substantially similar as described with respect to repeaters in FIGS. 1-4.

Figure 14:
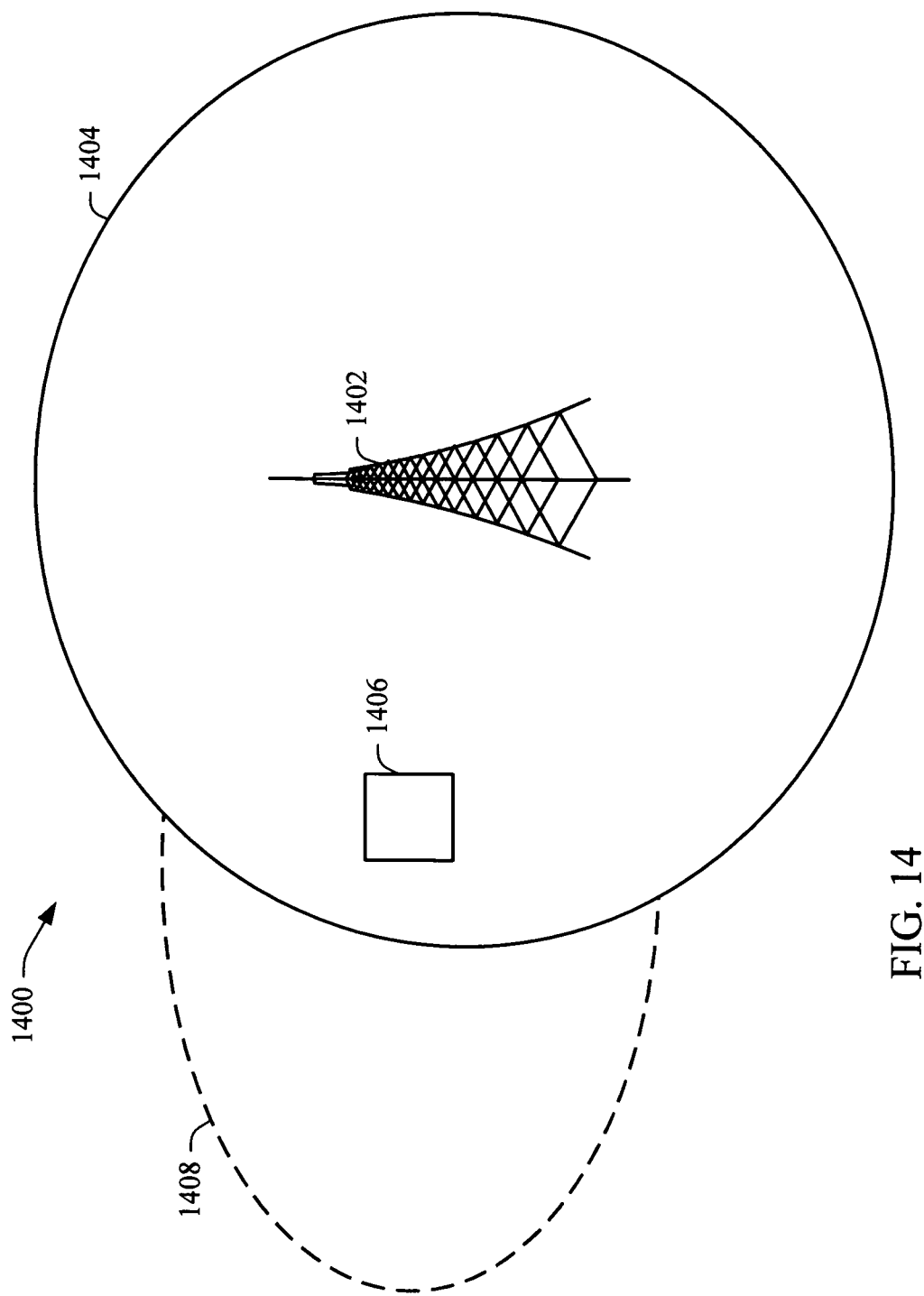
FIG. 14 is a diagram illustrating coverage area alterations with respect to a base station when a repeater is employed in a wireless environment.

Now referring to FIG. 14, coverage areas associated with a base station and a repeater are illustrated. A base station 1402, without aid of a repeater, can output signals over a geographic area represented by an oval 1404. Accordingly, user terminals existent within area 1404 can undergo communications with base station 1402. A repeater 1406 can be employed to extend coverage of the base station into a region 1408 that base station 1402 alone cannot reach. Thus, bi-directional communications can occur between a user terminal (not shown) within region 1408 and base station 1402, wherein such communications would not be enabled without utilization of repeater 1406.

Figure 15:
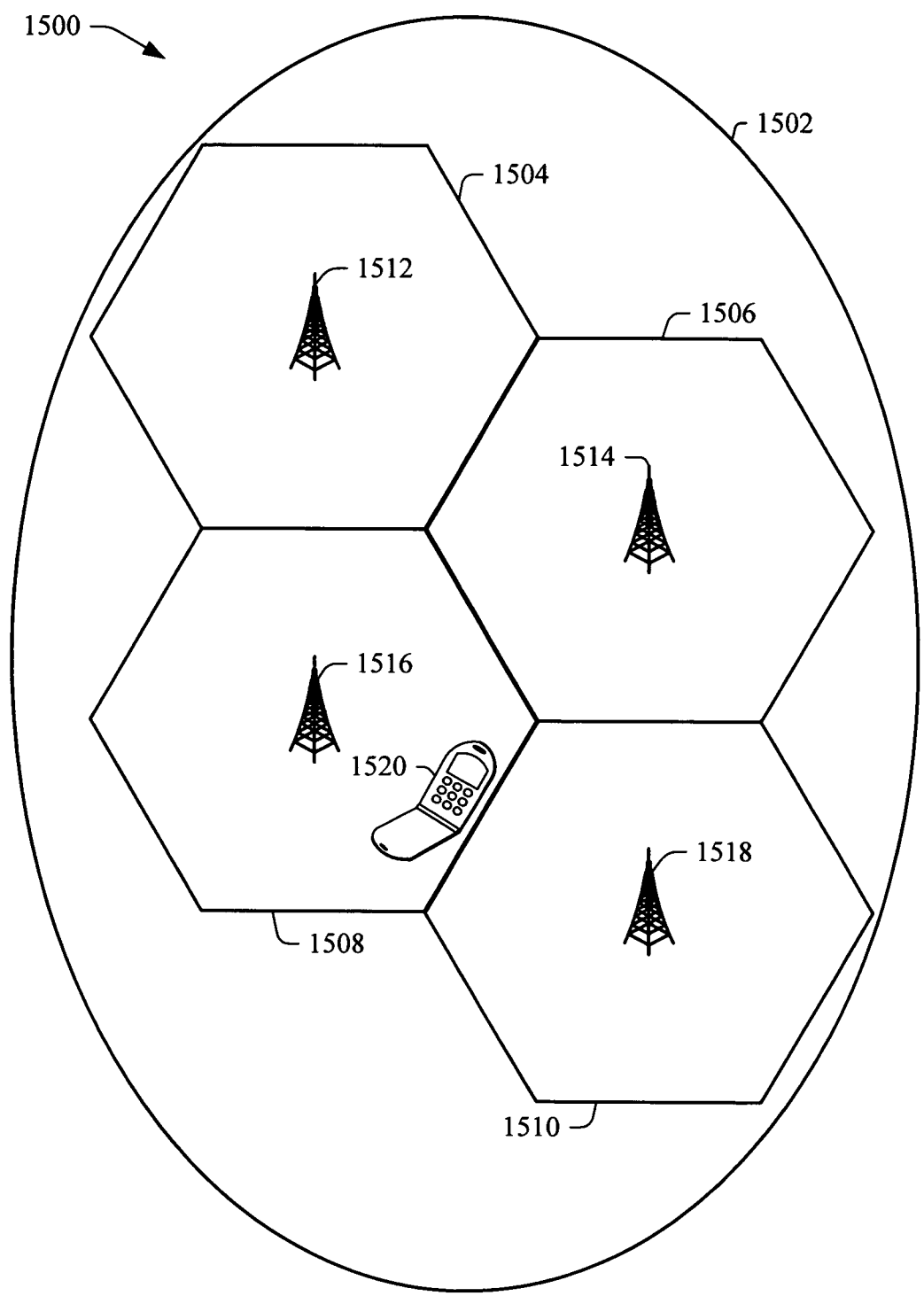
FIG. 15 is a wireless network system.

Now referring to FIG. 15, a high-level system overview of a communication network 1500 is illustrated. A region 1502 can be any suitable service area and can include any suitable number of sub-regions, or sectors, each of which can further include a base station (e.g., tower, transmitter, . . . ) from which a communication signal can be transmitted to provide service to the sector. In the idealistic network 1500, hexagonal sectors 1504, 1506, 1508, and 1510 are adjacent to one another, thereby creating a tiled arrangement. Each hexagonal sector is provided coverage by corresponding base stations 1512, 1514, 1516, and 1518. Thus, for example, a user terminal 1520 is located in sector 1508 whose coverage is provided by base station 1516. While sectors 1504, 1506, 1508, and 1510 are illustrated as hexagonal, it is understood that in actuality coverage areas of base stations 1512, 1514, 1516, and 1518 can vary in size and shape. Furthermore, base station coverage areas can overlap with one another and base stations can be sectored into, for example, three sectors. Other suitable configurations of the wireless network are also contemplated by the inventors of the subject invention and are intended to fall under the scope of the hereto-appended claims.

What has been described above includes examples of one or more contemplated aspects. It is, of course, not possible to describe every conceivable combination of components or methodologies for purposes of describing these aspects, but one of ordinary skill in the art may recognize that many further combinations and permutations of such aspects are possible. Accordingly, the embodiments described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
receiving at a repeater a time division duplex communications schedule transmitted by a base station, the time division duplex communications schedule being associated with the base station and a user terminal;
altering the time division duplex communications schedule at the repeater based at least in part on data indicative of an estimated position of the repeater, wherein altering the time division duplex communications schedule comprises
adjusting, as a first function of a location of the repeater with respect to the base station, forward link scheduled times, of the time division duplex communications schedule, relating to when forward communications are active in the forward link direction; and
adjusting, as a second function of a location of the repeater with respect to the user terminal, reverse link scheduled times, of the time division duplex communications schedule, relating to when reverse communications are active in the reverse link direction; and
selectively amplifying one or more communications signals at the repeater in one or more of the forward link direction and the reverse link direction based at least in part on the altered time division duplex communications schedule.

2. The method of claim 1, further comprising:
associating one or more sensors with the repeater to obtain the data indicative of the estimated position of the repeater.

3. The method of claim 1, further comprising:
receiving the one or more communications signals in the forward link direction; and
configuring an amplifier associated with the repeater to amplify the one or more received communications signals in the forward link direction.

4. The method of claim 1, further comprising:
receiving the one or more communications signals in the reverse link direction; and
configuring an amplifier associated with the repeater to amplify the one or more received communications signals in the reverse link direction.

5. The method of claim 1, further comprising:
dedicating an amplifier of the repeater to amplify the one or more communications signals in the forward link direction; and
providing power to the amplifier as a function of the altered time division duplex communications schedule.

6. The method of claim 1, further comprising:
dedicating an amplifier of the repeater to amplify the one or more communications signals in the reverse link direction; and
providing power to the amplifier as a function of the altered time division duplex communications schedule.

7. The method of claim 1, further comprising configuring an amplifier associated with the repeater to intermittently amplify communications in the forward link direction and intermittently amplify communications in the reverse link direction according to the altered time division duplex communications schedule.

8. The method of claim 7, wherein said configuring the amplifier comprises connecting radio-frequency switches in one of the forward link direction and the reverse link direction according to the altered time division duplex communications schedule.

9. The method of claim 1, further comprising:
configuring the repeater at least in part by associating the repeater with functionality similar to that associated with the user terminal, and utilizing the functionality to receive the time division duplex communications schedule.

10. The method of claim 1, further comprising configuring an amplifier to amplify the one or more communications signals according to the altered time division duplex communications schedule.

11. The method of claim 1, wherein said altering the time division duplex communications schedule comprises automatically adjusting the time division duplex communications schedule as a function of the estimated position of the repeater with respect to one or more of the base station and the user terminal.

12. A repeater apparatus for utilization in a time-division duplex (TDD) wireless environment, comprising:
means for receiving a communications schedule published by a base station, wherein the communications schedule is associated with the base station and a user terminal;
means for altering the communications schedule based at least in part on data indicative of an estimated position of the repeater, the means for altering comprising
means for adjusting, as a first function of a location of the repeater with respect to the base station, forward link scheduled times, of the communications schedule, relating to when forward communications are active in the forward link direction; and
means for adjusting, as a second function of a location of the repeater with respect to the user terminal, reverse link scheduled times, of the communications schedule, relating to when reverse communications are active in the reverse link direction; and
means for amplifying one or more communications signals between the base station and the user terminal based at least in part on the altered communications schedule.

13. The repeater apparatus of claim 12, wherein the user terminal comprises one or more of a cellular telephone, a personal digital assistant, a smart phone, a laptop computer, a desktop computer, or a wristwatch.

14. The repeater apparatus of claim 12, wherein the one or more communications signals comprise a voice signal.

15. The repeater apparatus of claim 12, wherein the one or more communications signals comprise a computer-related data signal.

16. The repeater apparatus of claim 12, wherein the one or more communications signals comprise one or more of a voice signal and one or more of a computer-related data signal.

17. The repeater apparatus of claim 12, further comprising:
means for identifying the communications schedule associated with the base station and the user terminal.

18. The repeater apparatus of claim 17, further comprising:
means for storing the received communications schedule; and means for analyzing the received communications schedule.

19. The repeater apparatus of claim 12, further comprising:
means for sensing one or more parameters associated with the repeater apparatus; and
means for amplifying the one or more communications signals based at least in part on the sensed one or more parameters.

20. The repeater apparatus of claim 19, wherein the one or more parameters comprise one or more of the estimated position of the repeater apparatus, a velocity associated with the repeater apparatus, an acceleration associated with the repeater apparatus, a direction of travel associated with the repeater apparatus, or an elevation of the repeater apparatus.

21. The repeater apparatus of claim 12, further comprising:
means for configuring a first amplifier to amplify a first plurality of signals in a forward link direction;
means for utilizing the first amplifier to amplify the first plurality of signals in the forward link direction;
means for configuring a second amplifier to amplify a second plurality of signals in a reverse link direction; and
means for utilizing the second amplifier to amplify the second plurality of signals in the reverse link direction.

22. The repeater apparatus of claim 12, further comprising means for configuring an amplifier to amplify a plurality of signals in a forward link direction and a reverse link direction as a function of the altered communications schedule.

23. The repeater apparatus of claim 22, further comprising means for connecting one or more amplifier stages based at least in part on the altered communications schedule.

24. The repeater apparatus of claim 12, further comprising:
means for sensing that a received signal of the one or more communications signals is traveling in one of a forward link direction and a reverse link direction; and
means for amplifying the received signal at least in part as a function of the sensed direction of travel.

25. A repeater to facilitate communication in a wireless communications environment, comprising:
a sensor to sense position-related data associated with the repeater;
a scheduling component to receive a communications schedule published by a base station, wherein the communications schedule is associated with the base station and a user terminal;
a compensation component to alter the received communications schedule based at least in part on the sensed position-related data, the compensation component being configured to
adjust, as a first function of the one or more parameters associated with the repeater as compared to a location of the base station, forward link scheduled times, of the communications schedule, relating to when forward communications are active in the forward link direction; and
adjust, as a second function of the position-related data associated with the repeater as compared to one or more parameters associated with the user terminal, reverse link scheduled times, of the communications schedule, relating to when reverse communications are active in the reverse link direction; and
an amplifier to amplify one or more communications signals in one or more of the forward link direction and the reverse link direction based at least in part on the altered communications schedule.

26. The repeater of claim 25, further comprising an interface component to monitor communications between the base station and the user terminal and to detect transmission of one or more signals indicative of the communications schedule by the base station.

27. The repeater of claim 26, further comprising an antenna to receive the one or more signals indicative of the communications schedule transmitted by the base station.

28. The repeater of claim 25, further comprising a configuration component to configure the amplifier to amplify the one or more communications signals in one or more of the forward link direction and the reverse link direction.

29. The repeater of claim 28, the configuration component to selectively couple a radio-frequency switch to an appropriate amplifier stage based at least in part on the altered communications schedule.

30. The repeater of claim 25, wherein the sensed position-related data includes one or more of an estimated location of the repeater, a velocity of the repeater, a direction of travel of the repeater, an acceleration of the repeater, or an elevation of the repeater.

31. The repeater of claim 25, wherein the sensor comprises a global positioning system sensor to estimate, at least in part, a location of the repeater.

32. The repeater of claim 25, wherein the wireless communications environment comprises one of a time division synchronous code division multiple access environment or a time division code division multiple access environment.

33. The repeater of claim 25, further comprising an antenna to receive one or more signals indicative of the communications schedule published by the base station.

34. The repeater of claim 33, further comprising:
a data store to retain the received one or more signals indicative of the communications schedule; and
a processor to facilitate configuration of the amplifier in accordance with the altered communications schedule.

35. The repeater of claim 25, wherein the repeater comprises a mobile terminal.

36. The repeater of claim 25, wherein the wireless communications environment comprises a time division synchronous code division multiple access environment.

37. A system to facilitate communication in a wireless communications environment, comprising:
a base station to publish a communications schedule associated with the base station and a user terminal in accordance with a time division duplex protocol; and
a repeater to receive the communications schedule, to estimate a location for the repeater, to alter the communications schedule based at least in part on the estimated location, and to amplify one or more communications signals between the base station and the user terminal based at least in part on the altered communications schedule,
wherein the repeater is configured to alter the communications schedule to adjust, as a first function of a location of the repeater with respect to the base station, forward link scheduled times, of the communications schedule, relating to when forward communications are active in a forward link direction, and
wherein the repeater is further configured to alter the communications schedule to adjust, as a second function of a location of the repeater with respect to the user terminal, reverse link scheduled times, of the communications schedule, relating to when reverse communications are active in a reverse link direction.

38. The system of claim 37, wherein the wireless communications environment comprises a time division synchronous code division multiple access environment.

39. The system of claim 37, the base station to further publish a plurality of communications schedules associated with the base station and a respective plurality of user terminals in accordance with the time division duplex protocol, the repeater to receive the plurality of communications schedules, the repeater to alter the plurality of received communications schedules based at least in part on the estimated location of the repeater, and the repeater to amplify communications signals between the base station and the plurality of user terminals in accordance with the plurality of altered communications schedules.

40. An article, comprising: a computer-readable medium having stored thereon instructions executable by a processor in a repeater to:
recognize one or more signals transmitted by a base station indicative of a communications schedule associated with the base station and a user terminal, the communications schedule compliant or compatible with a time division duplex protocol;
alter the communications schedule based at least in part on data indicative of an estimated location of the repeater at least in part by
adjusting, as a first function of a location of the repeater with respect to the base station, forward link scheduled times, of the communications schedule, relating to when forward communications are active in a forward link direction; and
adjusting, as a second function of a location of the repeater with respect to the user terminal, reverse link scheduled times, of the communications schedule, relating to when reverse communications are active in a reverse link direction; and
configure an amplifier to amplify one or more signals in one or more of the forward link direction and the reverse link direction based at least in part on the altered communications schedule.

41. The article of claim 40, wherein the computer readable medium has stored thereon further instructions executable by the processor to further enable the repeater to connect a radio-frequency switch to an amplifier stage as a function of the altered communications schedule.

42. The article of claim 40, wherein the computer readable medium has stored thereon further instructions executable by the processor to further enable the repeater to selectively provide power to an amplifier at least in part as a function of the altered communications schedule.

43. The article of claim 40, wherein the computer readable medium has stored thereon further instructions executable by the processor to further enable the repeater to:
sense one or more parameters associated with the repeater; and
alter the communications schedule based at least in part on the one or more sensed parameters.

44. A microprocessor in a repeater adapted to:
recognize a communications schedule transmitted by a base station and received at the repeater, wherein the communications schedule is associated with the base station and a user terminal in a time division duplex wireless environment;
alter the communications schedule based at least in part on an estimated position of the repeater, the microprocessor being configured to alter the communications schedule at least in part by
adjusting, as a first function of a location of the repeater with respect to the base station, forward link scheduled times, of the communications schedule, relating to when forward communications are active in a forward link direction; and
adjusting, as a second function of a location of the repeater with respect to the user terminal, reverse link scheduled times, of the communications schedule, relating to when reverse communications are active in a reverse link direction; and
configure an amplifier to amplify one or more signals in one or more of the forward link direction and the reverse link direction based at least in part on the altered communications schedule.

45. The method of claim 1, further comprising altering the time division duplex communications schedule at the repeater at least in part to compensate for a change of location of the repeater.

* * * * *